(12) United States Patent
Collet

(10) Patent No.: US 11,204,005 B2  
(45) Date of Patent: Dec. 21, 2021

(54) METHOD FOR DIAGNOSING SEALING IN A FUEL VAPOUR RECIRCULATION SYSTEM AND RELATED RECIRCULATION SYSTEM

(71) Applicant: Vitesco Technologies GmbH, Hanover (DE)

(72) Inventor: Thierry Collet, Toulouse (FR)

(73) Assignee: VITESCO TECHNOLOGIES GMBH, Hanover (DE)

(*) Notice: Subject to any disclaimer, the term of this patent is extended or adjusted under 35 U.S.C. 154(b) by 0 days.

(21) Appl. No.: 17/058,503

(22) PCT Filed: May 20, 2019

(86) PCT No.: PCT/FR2019/051141  
§ 371 (c)(1),  
(2) Date: Nov. 24, 2020

(87) PCT Pub. No.: WO2019/224465  
PCT Pub. Date: Nov. 28, 2019

(65) Prior Publication Data  
US 2021/0199070 A1    Jul. 1, 2021

(30) Foreign Application Priority Data  
May 24, 2018   (FR) ...................................... 1854360

(51) Int. Cl.  
*F02M 25/08*    (2006.01)  
*B60K 15/035*   (2006.01)

(52) U.S. Cl.  
CPC ... F02M 25/0818 (2013.01); B60K 15/03504 (2013.01); F02M 25/089 (2013.01);  
(Continued)

(58) Field of Classification Search  
CPC ............. F02M 25/0818; F02M 25/089; F02M 25/0854; F02M 25/0872; F02M 25/0836;  
(Continued)

(56) References Cited

U.S. PATENT DOCUMENTS

2007/0256671 A1   11/2007   Perry  
2014/0074385 A1    3/2014   Dudar et al.  
(Continued)

FOREIGN PATENT DOCUMENTS

EP    2 667 008    11/2013

OTHER PUBLICATIONS

Anonymous: "Loi de refroidissement de Newton", Wikipedia, XP055555650, Mar. 13, 2013, 3 pages, https://fr.wikipedia.org/w/index.php?title=Loi_de_refroidissement_de_Newton&oldid=89892523.  
(Continued)

*Primary Examiner* — Xiao En Mo  
(74) *Attorney, Agent, or Firm* — Nixon & Vanderhye

(57) ABSTRACT

Disclosed is a method for diagnosing sealing in a fuel vapor recirculation system for an engine of a motor vehicle. An electronic module is integrated into the engine control unit that is woken up and placed on standby periodically while the engine is off, at the start and end of time intervals in order to perform a respective leak diagnosis, the fuel vapor temperature Tsys being estimated as a function of a time t ending at the start of each interval and starting when the engine is switched off according to the following equation, in which Tamb is the ambient temperature measured, Tsys0 is the fuel vapor temperature when the vehicle is switched off, and tsys is a system response time:

$$T_{sys}(t) = T_{amb} + (T_{sys0} - T_{amb})e^{-t/t_{sys}}.$$

19 Claims, 4 Drawing Sheets

(52) U.S. Cl.
CPC .... *F02M 25/0836* (2013.01); *F02M 25/0854* (2013.01); *F02M 25/0872* (2013.01); *B60K 2015/03514* (2013.01); *F02M 2025/0845* (2013.01); *F02M 2025/0881* (2013.01)

(58) Field of Classification Search
CPC ... F02M 2025/0845; F02M 2025/0881; B60K 15/03504; B60K 2015/03514
See application file for complete search history.

(56) References Cited

U.S. PATENT DOCUMENTS

| | | | |
|---|---|---|---|
| 2015/0219522 A1 | 8/2015 | Tseng et al. | |
| 2015/0330349 A1 | 11/2015 | Kim | |
| 2015/0354480 A1* | 12/2015 | Dudar | B60W 20/50 701/22 |
| 2016/0069771 A1* | 3/2016 | Makki | F02M 25/0809 73/40.5 R |
| 2016/0186695 A1* | 6/2016 | Dudar | F02M 25/0809 73/40.5 R |
| 2016/0209292 A1* | 7/2016 | Dudar | F02M 25/0836 |
| 2016/0319776 A1* | 11/2016 | Dudar | F02M 25/0809 |
| 2017/0016794 A1* | 1/2017 | Dudar | G01M 3/025 |

OTHER PUBLICATIONS

International Search Report and Written Opinion of the ISA for PCT/FR2019/051141 dated Aug. 8, 2019, 16 pages.

* cited by examiner

METHOD FOR DIAGNOSING SEALING IN A FUEL VAPOUR RECIRCULATION SYSTEM AND RELATED RECIRCULATION SYSTEM

This application is the U.S. national phase of International Application No. PCT/FR2019/051141 filed May 20, 2019 which designated the U.S. and claims priority to FR Patent Application No. 1854360 filed May 24, 2018, the entire contents of each of which are hereby incorporated by reference.

BACKGROUND OF THE INVENTION

Field of the Invention

The present invention relates to an assembly of a fuel vapor recirculation system and an engine control unit for a motor vehicle internal combustion engine, and to a method for diagnosing sealing in a fuel vapor recirculation system for an internal combustion engine of a motor vehicle.

Description of the Related Art

Conventionally, the system comprises a fuel tank, a hydrocarbon vapor canister and pipes for fuel vapors including at least one pipe between the tank and the canister. The system also comprises a vent pipe from the canister provided with a natural vacuum leak detection device and a purge pipe suitable for connecting the canister to the engine by emerging in the engine.

Legislation in force in a number of countries requires that fuel vapors are not able to escape from the fuel tank or from the fuel vapor recirculation system to the outside of the motor vehicle. To this end, tests are carried out proving that the evaporation system is sealed and does not have any leaks, and that the fuel trapped in the hydrocarbon vapor canister can be recirculated to the engine for burning.

Part of these tests relates to the diagnosis of the sealing of the fuel vapor recirculation system when the engine is off. A known detection method is based on the vacuum that is created in the fuel vapor recirculation system after the engine is switched off.

As can be seen in FIGS. 4 and 5, these figures respectively show a dashed curve representing the pressure in the tank and a solid curve representing the temperature of the tank. When the engine of the motor vehicle is switched off, the fuel is hot, especially if the vehicle has been driven for a long time previously. On switch-off, there is a drop in the temperature T, shown as a function of time t in FIGS. 4 and 5. The pressures P and temperatures T will gradually rise again when the engine is operating again. The arrows in FIGS. 4 and 5 show the respective drips and rises in temperature T and pressure P.

For leak detection when the engine is off, the temperature in the tank will drop and a vacuum will be created in the system due to the fuel vapors condensing into a liquid. For a sealed fuel vapor recirculation system, this pressure drop can be seen in FIG. 4, while in FIG. 5, for an unsealed system, the pressure barely drops as the temperature decreases.

Leak detection tests on a fuel vapor recirculation system can also be carried out with the engine on. In this case, as the temperature increases, the fuel will partially evaporate, leading to a pressure increase in the system if the system is sealed, and little or no increase if not.

New tests require that the pressure be monitored in the fuel vapor recirculation system after the engine is switched off, at regular intervals for a predetermined period.

There are two main ways of producing a natural vacuum leak detection device according to the prior art.

The first way, disclosed in particular by US-A-2015/219522, proposes a valve arranged between the hydrocarbon vapor canister and the vent pipe of the fuel vapor recirculation system. This valve is closed during the engine-off leak detection diagnosis. It is controlled by the engine control unit, which remains on standby during diagnosis.

The second way is disclosed by US-A-2007/256671. An example of an assembly of a fuel vapor recirculation system and an engine control unit for a motor vehicle internal combustion engine representative of the disclosure of this document is also shown in FIG. 1 of the present patent application. This figure also shows an internal combustion engine and a fuel supply circuit connecting the fuel tank to the engine.

The fuel vapor recirculation system comprises a fuel tank 2, a hydrocarbon vapor canister 3 and pipes 6, 6a, 8 for fuel vapors including at least one pipe 6a between the tank 2 and the canister 3. A vent pipe 6 from the canister 3 is provided, equipped with a natural vacuum leak detection device 4 and an air filter 7. A purge pipe 8, suitable for connecting the canister 3 to the engine 1, is also provided. This purge pipe 8 emerges before an air intake 14 of the engine 1 in order to recirculate the fuel vapors by burning them in the engine 1.

The purge pipe 8 is provided with an electric valve 9 that opens in particular to purge the canister 3 of hydrocarbon vapor when it is operated by the engine control unit 5 in order to allow the fuel vapors to be carried back to the engine 1.

The engine control unit 5 is in charge of controlling the fuel vapor recirculation system and the operation of the internal combustion engine 1. The engine control unit 5 receives various parameters from the engine 1, elements associated with the engine 1 or outside ambient parameters, such as the outside temperature, the outside pressure and the humidity.

The fuel tank 2 is connected by a fuel supply pipe 10 to the engine 1, emerging more specifically in a common rail 12 with several injectors, of which a single injector is denoted by reference sign 13. The engine 1 has an outlet emerging into an exhaust manifold 15, in turn extended by an exhaust line for the gases produced by combustion in the engine 1, the exhaust line comprising gas decontamination elements and emissions monitoring elements, such as for example a lambda probe 17, which is illustrated in FIG. 1. A fuel return pipe 10a from the engine 1 to the fuel tank 2 is also provided.

The arrows in FIG. 1 show the path of the fuel vapors from the tank 2 to the fuel vapor canister 3 and from the canister 3 to the engine 1 during a purge.

A natural vacuum leak detection device 4 of the prior art comprises a mechanical part arranged between the fuel vapor canister 3 and the air filter 7 in the vent pipe 6. This mechanical part of the detection device 4 is associated with an electronic part known as the electronic module 4a, arranged near the fuel tank 2 and therefore remote from the mechanical part of the natural vacuum leak detection device 4. The electronic module 4a receives temperature information recorded around the fuel tank 2 by a temperature sensor 18 positioned on the tank 2.

The features of the mechanical part of the natural vacuum leak detection device 4 will now be described briefly with reference to FIG. 2 taken in combination with FIG. 1 for the reference signs. These features will be described in greater depth in the detailed description of the embodiments of the invention.

The natural vacuum leak detection device 4 comprises at least a first interface 20 communicating with a first portion of the vent pipe 6 leaving the canister 3 and a second interface 21 communicating with a second portion of the vent pipe 6 comprising an air filter 7 and emerging to the outside.

The detection device 4 comprises an electric valve 22 opening or closing a passage between the first and second interfaces 20, 21 so as to regulate the vacuum in the fuel vapor recirculation system. The detection device 4 also comprises a microswitch 23 associated with a pressure-sensitive membrane 24, the microswitch 23 switching to the closed position when a predetermined negative pressure is applied to the membrane 24. Means for detecting the position of the microswitch 23 are connected to the electronic module 4a, in turn connected to the engine control unit 5, the engine control unit 5 controlling a solenoid 25 associated with the electric valve 22.

In addition, the electronic module 4a associated with the natural vacuum leak detection device 4 controls the fuel vapor recirculation system when the engine control unit 5 is powered down, and provides the results to the engine control unit 5 when the unit 5 is woken up again.

When the engine control unit 5 is powered down, the natural vacuum leak detection device 4 is woken up at predetermined intervals, for example every ten minutes, in order to proceed with the acquisition of the switch position of the microswitch 23 in the mechanical part of the detection device 4. The fuel vapor temperature is also recorded by the temperature sensor 18 associated with the electronic module 4a.

When and how many times the microswitch 23 has been closed is also monitored. All of this information is sent to the engine control unit 5 at the start of a new driving cycle. The engine control unit 5 and the natural vacuum leak detection module communicate with each other via a proprietary protocol.

The main advantage of this detection device is that it offers very good performance for the detection of a 0.5 mm leak when the engine is off, and consumes very little energy. However, this system is very costly compared to the first prior art mentioned, and can be double the cost, mainly due to the complexity of the mechanical part of the detection device and the presence of an electronic unit.

In addition, performance is limited due to the slow communication between the engine control unit and the detection device detection module. The position of the microswitch can only be updated every 1.5 seconds in the best case scenario, which does not allow an accurate estimate of the size of the leak.

BRIEF SUMMARY OF THE INVENTION

The problem addressed by the present invention is that of making it easier to detect a leak in a fuel vapor recirculation system, with detection taking place when the engine is off.

To this end, the present invention relates to a method for diagnosing sealing in a fuel vapor recirculation system for an internal combustion engine of a motor vehicle, the system being controlled by an engine control unit that is active when the engine is operating, the system comprising a vent pipe connecting the system to the outside, this vent pipe being automatically mechanically shut off by a natural vacuum leak detection device as soon as the engine is off, negative pressure of the fuel in the system, which occurs with the cooling of the fuel vapor temperature, being detected and compared to a predetermined negative pressure, the reaching and maintenance of this negative pressure representing the sealing of the system from the outside, the detection device interacting with an electronic module monitoring the negative pressure and a temperature in the system and determining whether the system is sealed or not, characterized in that the electronic module is integrated into the engine control unit, which is woken up and placed on standby periodically when the engine is off, at the start and end respectively of predetermined time intervals, in order to perform a respective leak diagnosis, the fuel vapor temperature Tsys being estimated as a function of a time t ending at the start of each interval and starting when the engine is switched off according to the following equation, in which Tamb is the ambient temperature measured, Tsys0 is the fuel vapor temperature when the engine is switched off, tsys is a system response time, which adopts a negative value for the heating phases or a positive value for the cooling phases as a function of an off time of the engine, the system response time being equal to either a negative value of an initial time being the time between the engine being switched off and the maximum temperature estimated for the fuel vapors in the fuel tank, when an off time of the internal combustion engine is less than the initial time, or a final time being a time between the engine being switched off and an instant when the fuel vapor temperature is equal to the ambient temperature Tamb, when the off time of the internal combustion engine is greater than the initial time:

$$Tsys(t)=Tamb+(Tsys0-Tamb)e^{-t/tsys}.$$

A temperature taken outside the system does not necessarily mean that the temperature is taken outside the motor vehicle, but simply that the temperature is not taken in the fuel vapor recirculation system and particularly on the fuel tank.

The fact that the electronic module is integrated into the engine control unit does not mean that this module necessarily remains a separate entity from the rest of the engine control unit. On the contrary, the functions of the electronic module can be performed by elements already present in the engine control unit and the integration of the electronic module can take place mainly and solely through software changes to the engine control unit.

The automatic mechanical shutting off of the pipe by the natural vacuum leak detection device as soon as the engine is off means that this shut-off takes place without expending electrical energy and without a command from the engine control unit.

Compared with the closest prior art disclosing a diagnostic method using a natural vacuum leak detection device, the diagnostic method according to the present invention is simpler given that it incorporates the electronic module into the engine control unit, with elements already present in the engine control unit performing the role of the electronic module. The engine control unit thus controls the system equally well with the engine operating or the engine switched off.

This has been made possible by waking up the engine control unit when the engine is off for relatively short intervals in order not to discharge the battery of the motor vehicle. During these intervals, the engine control unit is capable of measuring the pressure and temperature, itself measured at a location remote from the system, and extrapolating this measured temperature in order to obtain an estimate of the fuel vapor temperature.

In addition, the temperature sensor arranged in the fuel tank of the system is replaced by one or more sensors that are remote from the system and already present in the motor vehicle, being associated with the engine control unit. This saves resources and reduces costs, as the sensor or sensors perform an auxiliary function in addition to their dedicated function and are already present in the vehicle. The fuel vapor temperature is estimated by software processing on the basis of the remote temperature measurement or measurements and does not therefore generate any additional costs or significant processing waiting time.

The other prior art cited in the introduction to the present patent application, with a stop valve instead of the detection device, discloses keeping the control unit on standby when the engine is switched off. However, according to this prior art, the valve of the system must be powered permanently so that it is kept in the closed position, as soon as the engine is switched off and continuously thereafter.

For this prior art, the closed position of the valve is not its natural rest position, unlike in the present invention, in which the system has a vent pipe connecting it to the outside that is automatically shut off by the natural vacuum leak detection device as soon as the engine is off. According to this prior art, this causes energy expenditure and the predetermined intervals cannot be maintained for long enough due to excessive load on the vehicle battery.

In addition, as the energy expenditure is significant, it also follows that the first predetermined measurement interval must take place relatively quickly after the engine has been switched off, without waiting for the temperature conditions to stabilize to make a diagnosis. A temperature estimate on the basis of a temperature measurement in another location on the vehicle and/or outside the vehicle is therefore skewed. In this case, the temperature of the tank must be known exactly and cannot be extrapolated from another temperature remote from the system, which requires an actual measurement of the temperature in the fuel tank and the presence of a temperature sensor on the tank.

Finally, according to this prior art, a succession of consecutive predetermined intervals can only be limited. The engine control unit cannot be put on standby between two intervals, given that the unit must keep the valve in the closed position, leading to continuous electrical energy expenditure that is too high to implement a recurrent diagnostic method spread over several intervals.

Advantageously, the system response time, when it is equal to the negative value of the initial time or the final time, is obtained by a map taking into account the engine off time and a temperature difference between a temperature of the engine and the ambient temperature, mapping being carried out for different ambient temperatures with measurements of engine off times and fuel vapor temperature increases, for both the heating and cooling phases.

These parameters are the parameters that have the biggest influence on the fuel vapor temperature. The outside ambient temperature is the temperature towards which the fuel vapor temperature tends when the engine is off. The fuel vapor temperature is hotter relative to the ambient temperature outside the vehicle the longer the engine has been on and the more recently the engine was switched off.

Advantageously, the time is counted when the engine is switched off, this time counting being used for waking up the engine control unit and placing it on standby at the start and end respectively of the predetermined intervals. Splitting up the diagnostic time with predetermined intervals having standby times of the engine control unit between them makes it possible to avoid excessive loads on the vehicle battery. A time counting function was already present on an engine control unit and can be used for the successive waking up and placing on standby of the engine control unit.

Advantageously, the time intervals are ten minutes long, the time intervals following on from each other over a period of at least two hours. Ten minutes relative to a total diagnostic period of at least two hours limits the predetermined intervals to acceptable levels of electricity consumption by the control unit, which is kept awake during these intervals.

Advantageously, a delay time of at least 90 minutes is provided between when the engine is switched off and the start of the first interval to perform the first leak diagnosis performed. This delay time allows for the harmonization of the fuel vapor temperature with the ambient temperature outside the motor vehicle and/or another temperature taken in a location on the vehicle other than in the system and therefore the correct extrapolation of the fuel temperature by the engine control unit.

The present invention relates to an assembly of a fuel vapor recirculation system and an engine control unit for a motor vehicle internal combustion engine, the system comprising a fuel tank, a hydrocarbon vapor canister and pipes for fuel vapors including at least one pipe between the tank and the canister, a vent pipe from the canister provided with a natural vacuum leak detection device and a purge pipe suitable for connecting the canister to the engine by emerging into the engine, characterized in that it implements a method according to the invention, the engine control unit incorporating an electronic module monitoring the negative pressure and temperature in the system and determining whether the system is sealed or not, the engine control unit being connected to at least one temperature sensor remote from the system and having means for estimating the fuel temperature in the system on the basis of the measurements from said at least one temperature sensor, the control unit also comprising time counting elements and means for waking up and placing on standby at the start and end respectively of predetermined intervals monitored by the time counting elements.

The present invention allows for reduced costs and also increases the capacity and robustness of a natural vacuum leak detection module. The engine control unit can wake up on request due to an engine off time counting function incorporated into the engine control unit. By using this function, which is already present in an engine control unit, it becomes possible to wake up the engine control unit every ten minutes, for example, in order to evaluate the switch position and temperature in the same way as a detection module. All of the operations to control the detection device performed by the electronic module can be controlled by the engine control unit. For example, the communication line between the engine control unit and the detection device can be used to control a solenoid associated with the valve of the detection device and also to control the switch position of a microswitch present in the device.

All of the software communication between the engine control unit and the natural vacuum leak detection device can be eliminated, which reduces the cost and possible faults. All of the diagnoses can be processed by the engine control unit to meet legislative requirements, for example one diagnosis every 500 ms.

The electronic module associated with the natural vacuum leak detection device is eliminated, which reduces the cost of the system by a factor of at least two. It was the price of such a detection device that was the main obstacle to the use thereof, and this obstacle has now been removed. In addition, a temperature sensor associated with the electronic module is no longer necessary and can be eliminated.

One drawback relating to the slow communication speed for obtaining the switch position is overcome, which allows for more accurate control of the fuel vapor emissions and estimation of the size of the leaks when the engine is operating.

Advantageously, the natural vacuum leak detection device comprises at least a first interface communicating with a first portion of the vent pipe leaving the canister and a second interface communicating with a second portion of the vent pipe comprising an air filter and emerging to the outside, the detection device comprising a first electric valve opening or closing a passage between the first and second interfaces and a microswitch associated with a pressure-sensitive membrane, the microswitch switching to the closed position when a predetermined negative pressure is applied to the membrane, means for detecting the position of the microswitch being connected to the engine control unit.

Advantageously, the first electric valve is a valve controlled by a solenoid. The solenoid pushes the first electric valve to an open position in which the two interfaces communicate with each other.

Advantageously, the purge pipe of the system comprises a second electric valve, the engine control unit controlling the second electric valve to purge the system.

BRIEF DESCRIPTION OF THE DRAWINGS

Other features, aims and advantages of the present invention will become apparent on reading the detailed description that follows and on examining the appended drawings provided by way of non-limiting examples, in which.

DETAILED DESCRIPTION OF THE PREFERRED EMBODIMENTS

Hereinafter, the fuel tank with its associated elements, such as the fuel vapor canister, will be referred to as the tank system.

Figure 1:
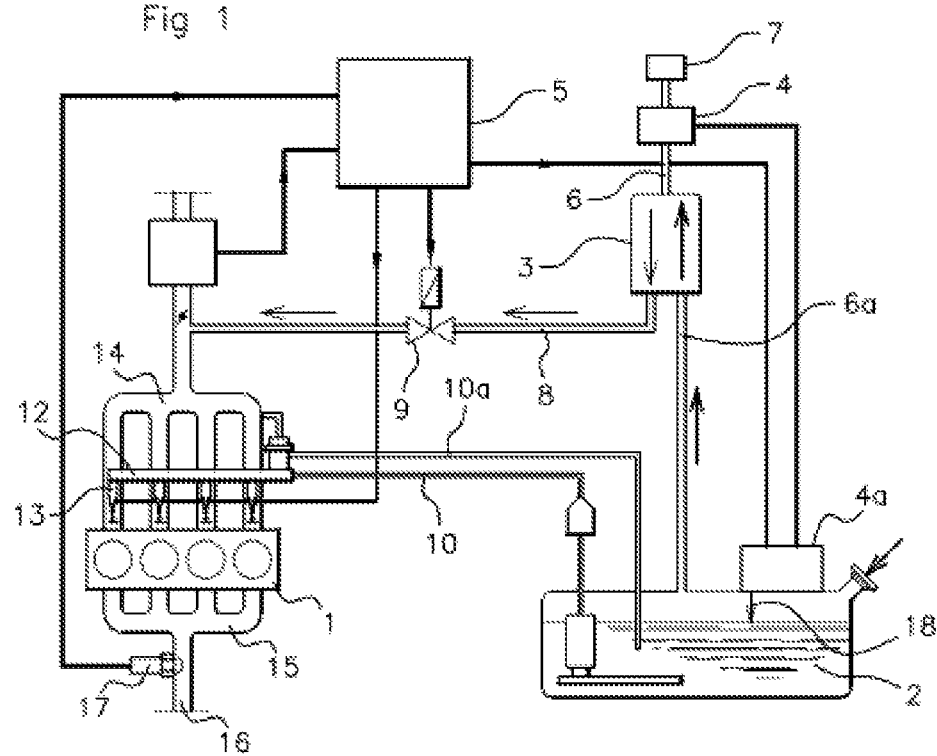
FIG. 1 is a schematic representation of an internal combustion engine and its fuel supply device with a fuel vapor recirculation system according to the prior art.
Figure 6:
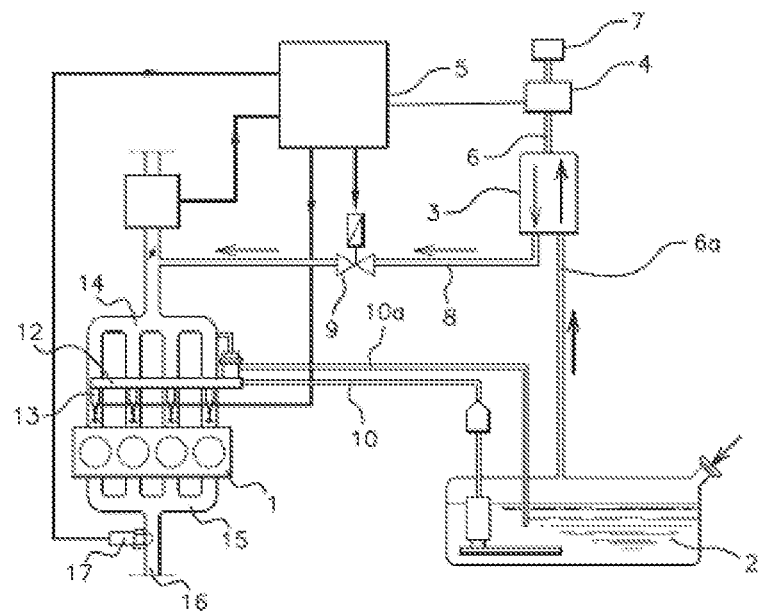
FIG. 6 is a schematic representation of an internal combustion engine and its fuel supply device with a fuel vapor recirculation system according to the present invention, the electronic module of the natural vacuum leak detection device being integrated into the engine control unit.

With reference to all of the figures and FIGS. 1 and 6 in particular, by way of comparison between the prior art shown in FIG. 1 and one embodiment of the present invention shown in FIG. 6, the present invention relates to a method for diagnosing sealing in a fuel vapor recirculation system for an internal combustion engine 1 of a motor vehicle.

The fuel vapor recirculation system is controlled by an engine control unit 5 that is active when the engine 1 is operating. The system comprises a vent pipe 6 connecting the system to the outside, this vent pipe 6 being automatically mechanically shut off by a natural vacuum leak detection device 4 as soon as the engine 1 is off.

Automatically mechanically shut off means that the engine control unit 5 does not exert any direct action in order to obtain this shut-off.

After the engine 1 has been switched off, a negative pressure of the fuel in the system occurs due to the cooling of the fuel vapor temperature. This negative pressure is detected and compared with a predetermined negative pressure, the reaching and maintaining of this negative pressure representing the sealing of the system from the outside.

Figure 4:
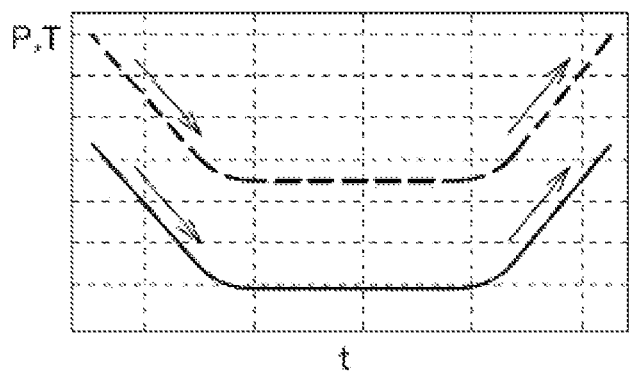
Figure 5:
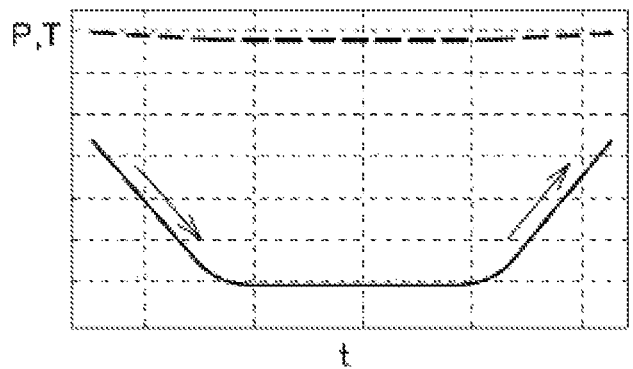

This is shown in particular in FIGS. 4 and 5, with reference to all of the figures for the reference signs. In FIG. 4, for a sealed system, the pressure P, illustrated by the dashed curve, drops with the temperature T, while in FIG. 5, the pressure P does not drop and remains substantially constant, which proves that the vacuum created by the condensing of the fuel vapors is not retained in the system.

The detection device 4 interacts with an electronic module 4a monitoring the negative pressure and temperature in the system to determine whether the system is sealed or not. According to the invention, as shown in FIG. 6, the electronic module 4a is integrated into the engine control unit 5. This engine control unit 5 is woken up and placed on standby periodically while the engine 1 is off, at the start and end respectively of predetermined time intervals, in order to perform a respective leak diagnosis.

Figure 3:
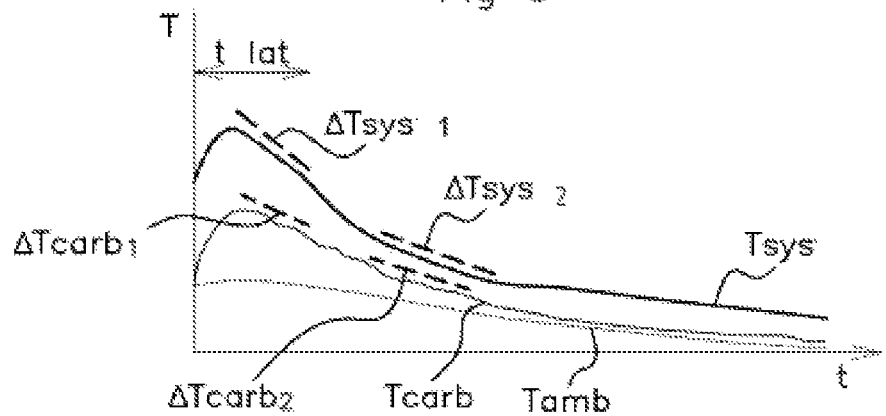
FIG. 3 shows temperature curves as a function of time recorded outside the motor vehicle, in the fuel tank and in the natural vacuum leak detection device respectively, FIGS. 4 and 5 respectively show pressure and temperature curves after the engine has been switched off and then back on again in a fuel vapor recirculation system, for a sealed system and an unsealed system respectively, the pressure in the system barely varying in the latter case.

According to the invention, the temperature sensor previously denoted by reference sign 18 in FIG. 1 is no longer used. On the contrary, the fuel vapor temperature, denoted Tsys in FIG. 3, is estimated as follows.

The fuel vapor temperature Tsys is estimated as a function of a time t ending at the start of each interval and starting when the engine is switched off according to the following equation:

$$Tsys(t) = Tamb + (Tsys0 - Tamb)e^{-t/tsys}.$$

In this equation, Tamb is the ambient temperature measured, Tsys0 is the fuel vapor temperature when the engine is switched off, and tsys is a system response time, as will be explained hereinafter.

There are two scenarios for calculating the system response time tsys. In the first scenario, the system response time tsys adopts a negative value for the heating phases. In the second scenario, the system response time tsys adopts a positive value for the cooling phases as a function of an engine off time.

In the first scenario, the system response time tsys is equal to a negative value of an initial time, being the time between the engine being switched off and the maximum temperature measured for the fuel vapors in the fuel tank, when an off time of the internal combustion engine is less than the initial time.

In the second scenario, the system response time tsys is equal to a final time, being the time between the engine being switched off and an instant when the fuel vapor temperature is equal to the ambient temperature Tamb, when the off time of the internal combustion engine is greater than the initial time.

In both scenarios, the system response time, when it is equal to the negative value of the initial time or the final time, can be obtained by a map taking into account the engine off time and a temperature difference between a temperature of the engine and the ambient temperature, mapping being carried out for different ambient temperatures with measurements of engine off times and fuel vapor temperature increases, for both the heating and cooling phases.

Figure 7:
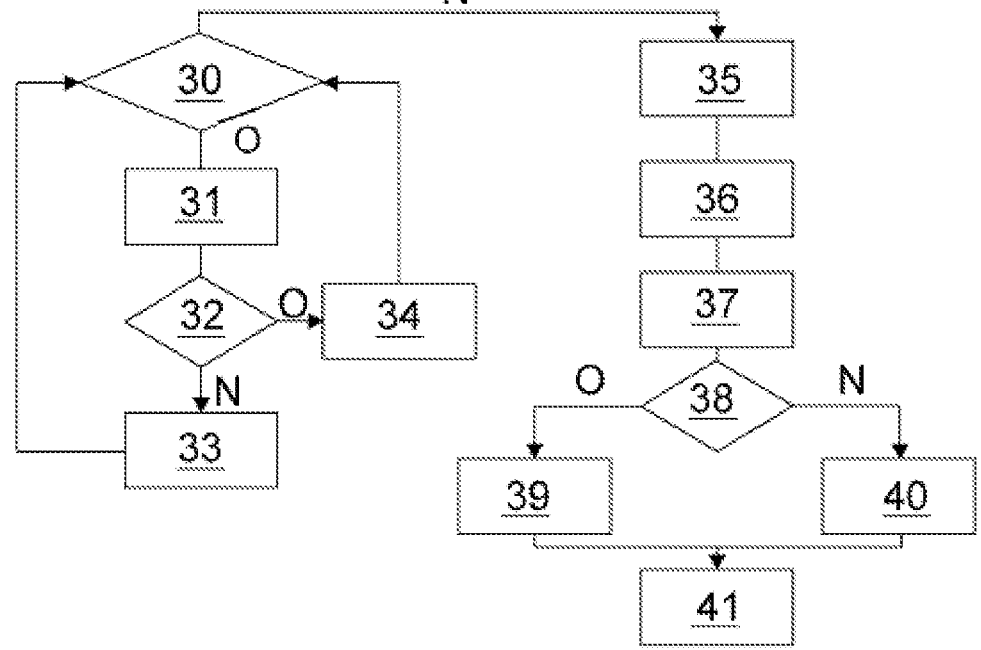
FIG. 7 shows a flow diagram of an embodiment of the method for diagnosing sealing in a fuel vapor recirculation system for an internal combustion engine of a motor vehicle.

FIG. 7 shows a flow diagram of a detection method according to a non-limiting embodiment of the present invention, described below.

The module 30 is a first question module to find out whether the motor vehicle is driving or is off based on an ignition key position or any technical equivalent representative of an engine that is on.

If the answer is yes, symbolized by Y, the engine temperature is measured in the measuring step denoted 31.

If the answer is no, symbolized by N, it is determined that the engine is off in an off identification step 35.

Continuing the detection method with an engine that is on, a second question 32 is asked, namely whether the engine temperature is less than an optimum engine operating temperature regulated by a cooling circuit and substantially between 60° C. and 90° C., otherwise.

If the engine temperature is less than the optimum operating temperature, which is symbolized by the output Y from the question 32, it is concluded in the identification step 34 that the engine is cold and the fuel vapor temperature is substantially equal to the ambient temperature.

If the engine temperature is greater than the optimum operating temperature, which is symbolized by the output N from the question 32, it is concluded in the identification step 33 that the engine is hot and the fuel vapor temperature is substantially equal to the ambient temperature plus a function depending on the engine operating time, the engine temperature and the ambient temperature.

Returning after the off identification step 35 to the memory storage step 36, an off fuel vapor temperature or Tsys0 is stored in the memory for the future calculation of the fuel vapor temperature Tsys.

In the calculation step 37, the response time tsys is calculated, not shown in the figures, as it is a constant as will be explained hereinafter.

Figure 8:
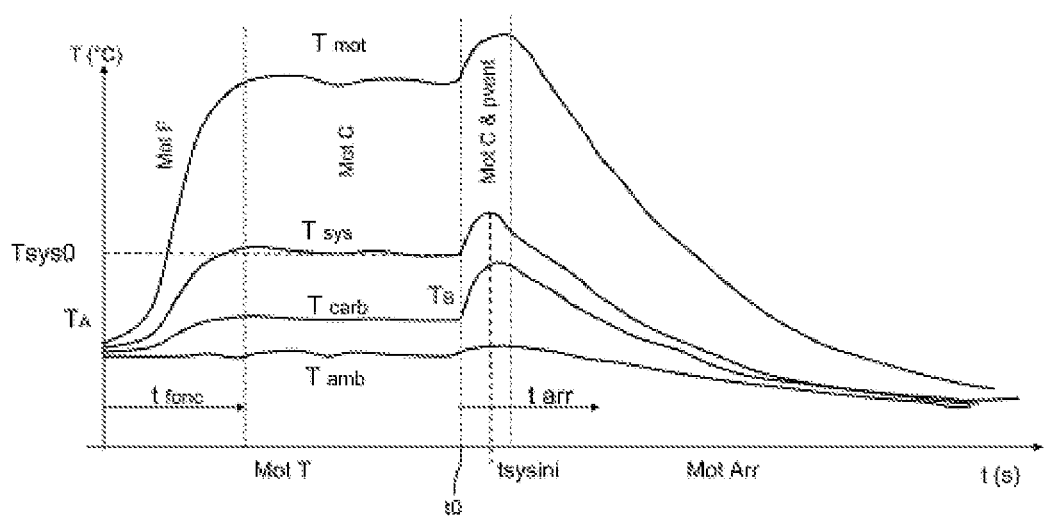
FIG. 8 shows various ambient, fuel, fuel vapor and engine temperature curves as a function of time expressed in seconds, for an engine when on and an engine when off.

Following a third question 38, it is determined whether the off time from when the engine was switched off to the start of a measurement interval is greater than or less than the initial system response time tsysini, the initial system response time tsysini being the time between the engine being switched off and the maximum fuel vapor temperature measured in the fuel tank, as illustrated in FIG. 8 by the dashed vertical straight line passing through the maximum fuel vapor temperature measured on the curve Tsys and brought back to the time scale t(s) expressed in seconds on the x axis of the graph in FIG. 8.

Newton's law of cooling states that the rate of heat loss of a body is directly proportional to the temperature difference between the body and its surroundings. At a time t, a temperature of a system Tsys(t) can be defined according to an ambient temperature Tamb and a temperature at time zero Tsys0 according to the following formula, where r is a constant:

$$Tsys(t) = Tamb + (Tsys0 - Tamb)e^{-rt}$$

A system response time tsys is defined that is equal to the inverse of the constant r or tsys=1/r.

In the step denoted 39, on a Y output from the third question 38, for which the off time t off of the internal combustion engine is less than the initial system response time tsysini, the system response time tsys is equal to the negative value of the initial system response time tsysini.

In the parallel step denoted 40, on an N output from the third question 38, for which the off time t off of the internal combustion engine is greater than the initial system response time tsysini, the system response time tsys is equal to the negative value of a final time being a time between the engine being switched off and an instant when the fuel vapor temperature is equal to the ambient temperature Tamb.

In the calculation step 41, the fuel vapor temperature Tsys is calculated according to the aforementioned equation, that is:

$$Tsys(t) = Tamb + (Tsys0 - Tamb)e^{-t/tsys}$$

where the variable t is the time variable starting from the off time t0 of the engine illustrated in FIG. 8 between the engine on Eng On and the engine off Eng Off. It must be noted that the engine on Eng On and engine off Eng Off times are given by way of illustration and are not limiting, and the engine on time Eng On can be considerably greater.

As illustrated in FIG. 8, the variable t can adopt a value t off taken at random having elapsed since the engine off time t0. The following then applies for this specific time t off:

$$Tsys(toff) = Tamb + (Tsys0 - Tamb)e^{-t\,off/tsys}$$

The important element for leak detection is seeing a temperature variation of at least 6° C. to 8° C. for at least 1 hour to ensure that this variation can generate the vacuum necessary to close the microswitch and therefore determine that the system is sealed. It is therefore not the absolute temperature, but the temperature variation, that is important. This is why information other than the fuel vapor temperature can be used because after the 90 minute waiting time, the temperature variations taken outside the system will be similar to the fuel vapor temperature.

"Taken" outside the system means that the fuel vapor temperature Tsys or system temperature is no longer measured, but is extrapolated from another temperature recorded and sent to the engine control unit 5. The engine control unit 5, which is in charge of the satisfactory operation of the engine 1 and in particular its combustion, receives temperature measurements taken at different locations on the vehicle or even outside the vehicle. The fuel vapor temperature Tsys will be estimated on the basis of one or more temperatures already recorded according to the method of the present invention.

In general, if the engine is cold, there is insufficient heat exchange between the engine and the fuel tank and the fuel vapor temperature is equal to the ambient temperature.

If the engine is hot, there is heat exchange between the engine and the tank system. This heat exchange is proportional to the operating time of the hot engine. Conventionally, an increase of 5° C. relative to the ambient temperature is observed after 1 hour of engine operation with an engine temperature of 90° C. and an ambient temperature of 20° C.

This temperature increase also depends on the speed of the vehicle and the temperature difference between the engine and the ambient air, but these parameters will not be taken into account as they are negligible in the off phase of the engine for leak detection. This increase will be characterized by a map taking into account the operating time of the engine and the temperature difference between the engine and the ambient air for the ambient temperature.

To produce the map, the temperature increase of the tank system will be measured at different ambient temperatures after one hour of driving at an average vehicle speed of 60 km/h, given that the engine temperature is conventionally regulated to 90° C. These values depend of course on the vehicle and the engine type. The map must therefore be characterized for each vehicle variant.

An equation is thus obtained giving the fuel vapor temperature Tsys as a function of the ambient temperature Tamb and one function according to the following parameters: an operating time t op, an engine temperature and the ambient temperature Tamb, the equation giving:

$$Tsys=Tamb+f(t\ op, Teng, Tamb)$$

When the vehicle is stopped and the ignition is switched off, there is heat exchange between the vehicle and the tank system.

The important element for leak detection is knowing when the drop in ambient temperature is representative of the drop in temperature of the tank system.

It is not therefore the absolute value of the tank system temperature that is important, but the variation thereof. This is why the phenomena of heat exchange from the vehicle to the tank system and from the tank system to the ambient environment are mainly taken into account during the engine off phase.

The heat exchange from the vehicle to the tank system is therefore characterized during the engine off phase. To this end, the tank system temperature, the ambient temperature and the engine temperature are measured. When the vehicle is stopped with the ignition off, the engine and the exhaust line have stored a certain quantity of heat, which is then released to the outside, particularly to the tank system.

Some of this heat is released to the tank system, resulting in a temperature increase. These thermal transfers are characterized by Newton's law, which is known.

The response time tsys during the engine off phase will therefore be characterized as a function of the ambient temperature and the engine temperature. The engine temperature with or without post-ventilation will influence the quantity of heat transferred to the tank system.

As mentioned previously, this increase will be characterized by a map taking into account the off time of the engine and the temperature difference between the engine and the ambient air. The engine off time and the tank system temperature increase will be measured at different ambient temperatures Tamb, for example 0, 10° C., 20° C., 30° C., 40° C.

This test will be repeated at different engine temperatures Teng when the engine is switched off, for example 80° C., 90° C., 100° C., 110° C. It will thus be possible to characterize the system response time tsys for the heating phases with a positive system response time as a function of the engine off time, and estimate the tank system temperature profile as a function of the engine off time.

In the case of cooling phases, a final time is taken into account, which is the time from when the engine is switched off to when the tank temperature is equal to the ambient temperature Tamb. This final time will be stored in a map on the basis of the measurements taken previously as a function of the engine and ambient temperatures.

The steps according to modules 39, 40 and 41 set out above with reference to FIG. 7 will then be performed to calculate the fuel vapor temperature Tsys. The time for which the engine 1 is off can be counted. The main purpose of this time counting is to carry out the wake-ups at predetermined intervals to perform a respective leak diagnosis, but it can also be used to calculate the time elapsed since the engine 1 was switched off, which can be taken into account in order to estimate the fuel vapor temperature Tsys.

The time intervals can be ten minutes long, the time intervals following on from each other over a period of at least two hours. This can vary depending on the detection tests required by different legislation and that take place with the engine off.

Still with particular reference to FIGS. 3 and 6, a delay time t del of at least 90 minutes can be provided between the engine 1 being switched off and the first leak diagnosis performed. With particular reference to FIG. 3, three temperature curves are shown after the engine 1 has been switched off, outside ambient temperature Tamb, fuel temperature Tsys and estimated temperature Tsys in the fuel vapor recirculation system respectively, as a function of time t. The three temperature curves T decrease as a function of time t, but with different gradients, particularly just after the engine 1 is switched off.

For example, the fuel temperature Tfuel and estimated system temperature Tsys increase just after switching off, which of course the outside ambient temperature Tamb does not. If we compare two pairs of temperature gradients ΔTfuel1 and ΔTsys1; ΔTfuel2 and ΔTsys2 respectively for the fuel temperature Tfuel and the estimated temperature Tsys, but taken at different times after the engine 1 is switched off, the pair of gradients ΔTfuel2 and ΔTsys2, taken a long time after the engine 1 is switched off, are closer to each other than the pair of gradients ΔTfuel1 and ΔTsys1 taken in a delay time t del just after switching off. Through experience, it has been found that the delay time t del can be approximately 90 minutes.

With reference to FIG. 8, ambient Tamb, fuel tank Tfuel and fuel vapor Tsys temperature curves T (° C.) are shown as a function of time t expressed in seconds (s) for an engine that is on Eng On and then an engine that is off Eng Off.

For an engine that is on Eng On, the engine can be cold Eng C at the start of driving or it can have heated up Eng H. After switching off, post-ventilation pvent of the still-hot engine Eng H is performed.

The operating time t op is the time taken for a cold engine Eng C to become hot Eng H. The time t off is the time elapsed after the engine is switched off, for example to the start of a measurement interval. TA is the starting temperature of an engine at the start of operation, the temperatures mentioned previously being the same if the engine has been off for long enough, and TB is the fuel temperature when the engine is switched off.

When the engine is switched off, the fuel, fuel vapor and engine temperatures increase slightly then decrease slowly and evenly to return to ambient temperature Tamb.

The engine temperature T eng, the operating time of the engine t op for a cold engine Eng C to become hot and the ambient temperature Tamb make it possible to characterize the quantity of heat stored by and around the fuel tank during the operation of the engine by thermal radiation and convection from the exhaust line and the engine cooling system.

The heat stored is released to the system when the vehicle is switched off as there is no longer any cooling due to the movement and speed of the vehicle. In addition, if the temperature conditions are met, post-ventilation pvent of the cooling system can occur, which will amplify this heat increase. This heat release can be characterized by the engine temperature T eng, engine operating time t op, off time t off and ambient temperature T amb parameters.

After a certain off time, the heat stored is completely dissipated and the temperature characteristic is no longer based on the inertia of the tank system and the ambient temperature T amb. With particular reference to FIG. 6, the present invention relates to an assembly of a fuel vapor recirculation system and an engine control unit 5 for a motor vehicle internal combustion engine 1. As previously mentioned for a system of the prior art, the system comprises a fuel tank 2, a hydrocarbon vapor canister 3 and pipes 6, 8 for fuel vapors including at least a pipe 6*a* between the tank 2 and the canister 3, a vent pipe 6 from the canister 3 provided with a natural vacuum leak detection device 4 and a purge pipe 8 suitable for connecting the canister 3 to the engine 1 by emerging in the engine 1.

According to the invention, the engine control unit 5 incorporates an electronic module monitoring the negative pressure and temperature in the system and determining whether the system is sealed or not. The engine control unit 5 is connected to at least one temperature sensor remote from the system. The engine control unit 5 has means for estimating the fuel temperature in the system on the basis of the measurements from said at least one temperature sensor. The control unit also comprises time counting elements and means for waking up and placing on standby at the start and end respectively of predetermined time intervals that are monitored by the time counting elements.

Figure 2:
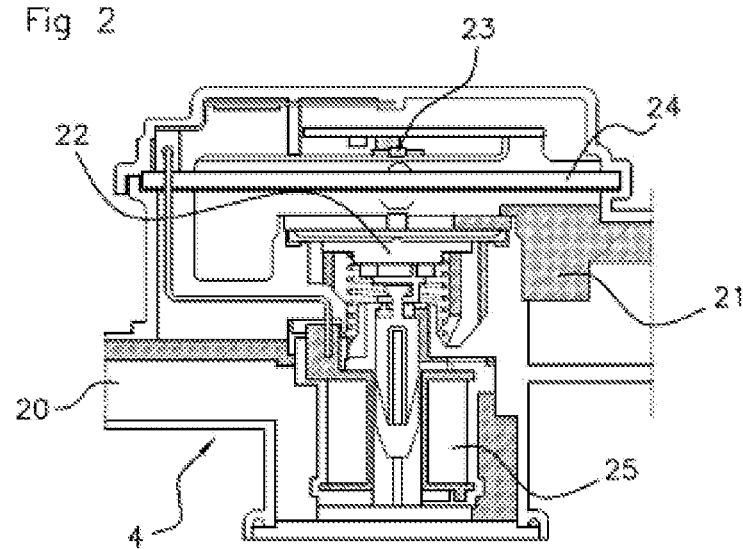
FIG. 2 is a schematic representation of the mechanical part of a natural vacuum leak detection device, such a mechanical part being suitable for use in a fuel vapor recirculation system according to one embodiment of the present invention.

With particular reference to FIG. 2, the natural vacuum leak detection device 4 can comprise at least a first interface 20 communicating with a first portion of the vent pipe 6 leaving the canister 3 and a second interface 21 communicating with a second portion of the vent pipe 6 comprising an air filter 7 and emerging to the outside.

The detection device 4 also comprises a first electric valve 22 closing or opening a passage between the first and second interfaces 20, 21 and a microswitch 23 associated with a pressure-sensitive membrane 24, the microswitch 23 switching to the closed position when a predetermined negative pressure is applied to the membrane 24. The detection device 4 comprises means for detecting the position of the microswitch 23 and sends this data to the engine control unit 5.

The first electric valve 22 can be a valve controlled by a solenoid 25. The solenoid 25 pushes the valve to an open position in which the two interfaces 20, 21 communicate with each other.

The fuel vapor recirculation system is suitable for being sealed when the engine 1 is off. The engine control unit 5 monitors the state of the microswitch 23 incorporated into the detection device 4. As the fuel vapor temperature drops due to the cooling of the fuel, the pressure in the system and the detection device 4 drops. The microswitch 23, then in an open position, closes with the pressure drop, which is detected by the engine control unit 5. Its change of state indicates that the system is sealed.

If the engine control unit 5 does not observe this change within a predetermined time limit, the engine control unit 5 diagnoses a lack of sealing of the system and can determine the size of the leak. The engine control unit 5 does not intervene directly and actively during detection, but has a passive role of monitoring the microswitch 23.

The solenoid 25 is powered by the engine control unit 5 and is only activated when the engine is on. In its non-activated state, the electric valve 22 referred to as the first electric valve seals the system and protects it against the creation of too strong a vacuum inside it.

The system can also comprise a so-called purge pipe provided with a second electric valve 9. This purge pipe 8 is suitable for connecting the canister 3 to the engine 1 by emerging in the engine 1. The engine control unit 5 controls the second electric valve 9 to purge the system.

The invention claimed is:

1. A method for diagnosing sealing in a fuel vapor recirculation system for an internal combustion engine of a motor vehicle, the fuel vapor recirculation system being controlled by an engine controller that is active when the engine is operating, the fuel vapor recirculation system including a vent pipe connecting the fuel vapor recirculation system to the outside, the vent pipe being automatically mechanically shut off by a natural vacuum leak detector as soon as the internal combustion engine is off, the method comprising:

interacting, by the natural vacuum leak detector, with an electronic module monitoring negative pressure of the fuel in the fuel vapor recirculation system and a temperature in the fuel vapor recirculation system to determine whether the fuel vapor recirculation system is sealed or not, the electronic module being integrated into the engine controller, the engine controller being woken up and placed on standby periodically when the engine is off, at the respective start and the respective end of predetermined time intervals, in order to perform a respective leak diagnosis;

estimating a fuel vapor temperature Tsys as a function of a time t ending at the start of each of the time intervals and starting when the engine is switched off according to the following equation:

$$Tsys(t)=Tamb+(Tsys0-Tamb)e^{-t/tsys}, \text{ in which}$$

Tamb is an ambient temperature measured,

Tsys0 is the fuel vapor temperature when the engine is switched off, and tsys is a system response time, which adopts a negative value for heating phases or a positive value for cooling phases as a function of an off time of the engine, the system response time being equal to either (i) a negative value of an initial time that is the time between the engine being switched off and a maximum temperature estimated for fuel vapors in a fuel tank, when an off time of the internal combustion engine is less than the initial time, or (ii) a final time that is a time between the engine being switched off and an instant when the fuel vapor temperature is equal to the ambient temperature Tamb, when the off time of the internal combustion engine is greater than the initial time; and determining that the fuel vapor recirculation system is sealed when it is detected that the monitored negative pressure drops as the estimated fuel vapor temperature drops, then the monitored negative pressure rises and reaches a predetermined negative pressure.

2. The method as claimed in claim 1, wherein the system response time, when equal to the negative value of the initial time or the final time, is obtained by a map taking into account the engine off time and a temperature difference between a temperature of the engine and the ambient temperature, mapping being carried out for different ambient temperatures with measurements of engine off times and fuel vapor temperature increases, for both the heating and cooling phases.

3. The method as claimed in claim 1, wherein the time is counted when the engine is switched off, the time counting being used for waking up the engine controller and placing the engine controller on standby at the respective start and end of the predetermined intervals, in order to perform a respective leak diagnosis.

4. The method as claimed in claim 1, wherein the time intervals are ten minutes long, the time intervals following each other over a period of at least two hours.

5. The method as claimed in claim 1, wherein a delay time t del of at least 90 minutes is provided between the engine being switched off and the start of the first interval in order to perform a leak diagnosis.

6. An assembly implementing the method as claimed in claim 1, the assembly comprising:
the fuel vapor recirculation system comprising
the fuel tank,
a hydrocarbon vapor canister, and
a plurality of pipes for fuel vapors including
at least one first pipe between the tank and the hydrocarbon vapor canister,
the vent pipe from the hydrocarbon vapor canister provided with the natural vacuum leak detector, and
a purge pipe configured to connect the hydrocarbon vapor canister to the internal combustion engine by emerging into the internal combustion engine; and
the engine controller for the internal combustion engine of the motor vehicle, the engine controller incorporating the electronic module configured to monitor the negative pressure and the temperature in the fuel vapor recirculation system and determine whether the fuel vapor recirculation system is sealed or not, the engine controller being connected to at least one temperature sensor remote from the fuel vapor recirculation system and being configured to estimate the fuel vapor temperature Tsys in the fuel vapor recirculation system based on measurements from said at least one temperature sensor, the engine controller comprising time counters and being configured to wake up and place on standby at the respective start and end of the predetermined intervals monitored by the time counters.

7. The assembly as claimed in claim 6, wherein the natural vacuum leak detector comprises
a first interface communicating with a first portion of the vent pipe leaving the hydrocarbon vapor canister,
a second interface communicating with a second portion of the vent pipe comprising an air filter and emerging to the outside,
a first electric valve opening or closing a passage between the first and second interfaces, and
a microswitch associated with a pressure-sensitive membrane, the microswitch being automatically returned to a closed position when a predetermined negative pressure is applied to the pressure-sensitive membrane, a position detector configured to detect a position of the microswitch being connected to the engine controller.

8. The assembly as claimed in claim 7, wherein the first electric valve is controlled by a solenoid.

9. The assembly as claimed in claim 7, wherein the purge pipe of the fuel vapor recirculation system comprises a second electric valve, the engine controller controlling the second electric valve in order to purge the fuel vapor recirculation system.

10. The method as claimed in claim 2, wherein the time is counted when the engine is switched off, the time counting being used for waking up the engine controller and placing the engine controller on standby at the respective start and end of the predetermined intervals, in order to perform a respective leak diagnosis.

11. The method as claimed in claim 2, wherein the time intervals are ten minutes long, the time intervals following each other over a period of at least two hours.

12. The method as claimed in claim 3, wherein the time intervals are ten minutes long, the time intervals following each other over a period of at least two hours.

13. The method as claimed in claim 2, wherein a delay time t del of at least 90 minutes is provided between the engine being switched off and the start of the first interval in order to perform a leak diagnosis.

14. The method as claimed in claim 3, wherein a delay time t del of at least 90 minutes is provided between the engine being switched off and the start of the first interval in order to perform a leak diagnosis.

15. The method as claimed in claim 4, wherein a delay time t del of at least 90 minutes is provided between the engine being switched off and the start of the first interval in order to perform a leak diagnosis.

16. An assembly implementing the method as claimed in claim 2, the assembly comprising:
the fuel vapor recirculation system comprising
the fuel tank,
a hydrocarbon vapor canister, and
a plurality of pipes for fuel vapors including
at least one first pipe between the tank and the hydrocarbon vapor canister,
the vent pipe from the hydrocarbon vapor canister provided with the natural vacuum leak detector, and
a purge pipe configured to connect the hydrocarbon vapor canister to the internal combustion engine by emerging into the internal combustion engine; and
the engine controller for the internal combustion engine of the motor vehicle, the engine controller incorporating the electronic module configured to monitor the negative pressure and the temperature in the fuel vapor recirculation system and determine whether the fuel vapor recirculation system is sealed or not, the engine controller being connected to at least one temperature sensor remote from the fuel vapor recirculation system and being configured to estimate the fuel vapor temperature Tsys in the fuel vapor recirculation system based on measurements from said at least one temperature sensor, the engine controller comprising time counters and being configured to wake up and place on standby at the respective start and end of the predetermined intervals monitored by the time counters.

17. An assembly implementing the method as claimed in claim 3, the assembly comprising:
the fuel vapor recirculation system comprising
the fuel tank,
a hydrocarbon vapor canister, and
a plurality of pipes for fuel vapors including
at least one first pipe between the tank and the hydrocarbon vapor canister,
the vent pipe from the hydrocarbon vapor canister provided with the natural vacuum leak detector, and
a purge pipe configured to connect the hydrocarbon vapor canister to the internal combustion engine by emerging into the internal combustion engine; and
the engine controller for the internal combustion engine of the motor vehicle, the engine controller incorporating the electronic module configured to monitor the negative pressure and the temperature in the fuel vapor recirculation system and determine whether the fuel vapor recirculation system is sealed or not, the engine controller being connected to at least one temperature sensor remote from the fuel vapor recirculation system and being configured to estimate the fuel vapor temperature Tsys in the fuel vapor recirculation system based on measurements from said at least one temperature sensor, the engine controller comprising time counters and being configured to wake up and place on standby at the respective start and end of the predetermined intervals monitored by the time counters.

18. An assembly implementing the method as claimed in claim 4, the assembly comprising:
  the fuel vapor recirculation system comprising
    the fuel tank,
    a hydrocarbon vapor canister, and
    a plurality of pipes for fuel vapors including
      at least one first pipe between the tank and the hydrocarbon vapor canister,
      the vent pipe from the hydrocarbon vapor canister provided with the natural vacuum leak detector, and
      a purge pipe configured to connect the hydrocarbon vapor canister to the internal combustion engine by emerging into the internal combustion engine; and
  the engine controller for the internal combustion engine of the motor vehicle, the engine controller incorporating the electronic module configured to monitor the negative pressure and the temperature in the fuel vapor recirculation system and determine whether the fuel vapor recirculation system is sealed or not, the engine controller being connected to at least one temperature sensor remote from the fuel vapor recirculation system and being configured to estimate the fuel vapor temperature Tsys in the fuel vapor recirculation system based on measurements from said at least one temperature sensor, the engine controller comprising time counters and being configured to wake up and place on standby at the respective start and end of the predetermined intervals monitored by the time counters.

19. An assembly implementing the method as claimed in claim 5, the assembly comprising:
  the fuel vapor recirculation system comprising
    the fuel tank,
    a hydrocarbon vapor canister, and
    a plurality of pipes for fuel vapors including
      at least one first pipe between the tank and the hydrocarbon vapor canister,
      the vent pipe from the hydrocarbon vapor canister provided with the natural vacuum leak detector, and
      a purge pipe configured to connect the hydrocarbon vapor canister to the internal combustion engine by emerging into the internal combustion engine; and
  the engine controller for the internal combustion engine of the motor vehicle, the engine controller incorporating the electronic module configured to monitor the negative pressure and the temperature in the fuel vapor recirculation system and determine whether the fuel vapor recirculation system is sealed or not, the engine controller being connected to at least one temperature sensor remote from the fuel vapor recirculation system and being configured to estimate the fuel vapor temperature Tsys in the fuel vapor recirculation system based on measurements from said at least one temperature sensor, the engine controller comprising time counters and being configured to wake up and place on standby at the respective start and end of the predetermined intervals monitored by the time counters.

* * * * *